United States Patent Office 3,044,977

Patented July 17, 1962

3,044,977

ADHESIVE FOR ATTACHING COPPER FOILS TO OTHER OBJECTS COMPRISING A BUTADIENE-ACRYLONITRILE COPOLYMER, A PHENOL-ALDEHYDE RESIN AND A MONOCARBOXYLIC ACID

Thomas Coe, Eindhoven, Netherlands, assignor to North American Philips Company, Inc., New York, N.Y., a corporation of Delaware No Drawing. Filed May 23, 1958, Ser. No. 737,210
Claims priority, application Netherlands May 27, 1957
2 Claims. (Cl. 260—43)

This invention relates to an adhesive for, to a method of attaching copper foils to other objects with the use of this adhesive, and to objects manufactured of copper foils attached to other objects in this way.

Copper foils may be attached to other objects with the use of an adhesive consisting of a copolymer of butadiene and acrylonitrile and mixed with a resin of the phenol-aldehyde type. As is well-known, this is a thermo-setting mixture and by the use of heat and pressure it is converted into the hardened final state, a metal such as copper being bonded to the layer to which a copper foil is to be secured, such as a layer of synthetic resin, for example synthetic resin of the phenol aldehyde type with paper as a filler. A firm junction is then obtained between the copper foil and the synthetic resin or the material with which the copper is to be joined, at least when use is made of copper manufactured by the so-called electrolytic method and this copper has been preliminarily deprived of traces of fat which remain thereon, for example, when touched by the fingers, and of copper oxide which always forms when copper is in contact with the atmosphere.

The method of pre-treatment of the copper coil is always necessary and even then there is a risk of the adherence being insufficient as a result of renewed occurrence of fat or copper oxide.

It has been found that this treatment may be omitted when the adhesive is mixed in a quantity of from 5% to 60% by weight of the dry adhesive with an aliphatic monocarboxylic acid containing from 1 to 4 carbon atoms, which may also contain a hydroxyl group and a chlorine atom, and that even use may be made of a foil obtained by rolling, which is intended to mean a copper foil which has assumed the form of a foil due to deformation of copper. It has been found that upon treatment of the copper foil with adhesive, which, according to the invention, contains an acid, a firm junction is established between copper and, for example, a thermo-setting synthetic resin, which is converted at the same time as the adhesive layer into the hardened final state, which junction satisfies the condition that a copper foil joined with the resin only in part can withstand a reasonable load upon bending over by 90° and subsequently loading the loose part of the strip and that, even after soldering to the copper, no weak junction is formed. Furthermore, the electrical resistance of the thermo-set synthetic resin appears not to have decreased as a result of this use of adhesive modificated with acid.

The copolymer of acrylonitrile and butadiene which is used may be the rubber-like copolymer of butadiene 1,3 with acrylonitrile in the ratio 55:45, 67:33 or 75:25, but similar copolymers may be used as well.

The phenol-aldehyde resins must be thermosetting and for this purpose may be provided with hexamethylenetetramine. They may consist of condensates of phenol, cresol, xylenol and resorcin, whilst formaldehyde, acetaldehyde or butyraldehyde is used as the aldehyde.

The ratio between the copolymer of butadiene and acrylonitrile and the phenol-aldehyde resin may vary between 20% and 200% by weight of the copolymer although preferably from 100% to 150% thereof is used.

The invention may advantageously be used in the manufacture of synthetic-resin layers coherent with copper foil, which are indicated by "printed circuit" and consist of a copper-foil pattern which is coherent with a panel of synthetic resin and more particularly of a thermo-set phenol-aldehyde condensate.

*Example*

An adhesive of the following composition was manufacured:

| | Parts |
|---|---|
| Rubber-like copolymer (25:75) of acrylonitrile and butadiene | 80 |
| Cresol formaldehyde resol | 100 |
| Formic acid | 15 |

This mixture was dissolved in 800 parts of methyl ethyl ketone, resulting in a smearable adhesive, a layer of which is smeared on a copper surface not deprived of residues of fat and copper oxide.

The methyl ethyl ketone is allowed to evaporate from the layer provided, for example by heating at about 130° C. for half an hour, the copper foil thus pre-treated is laid at last on a stack of paper layers impregnated with a hardenable phenol aldehyde, the stack is introduced into a press and heated at a temperature of about 160° C. for 30 minutes at a pressure of 60 atms.

The adherence was measured in that a 2½ cms. wide copper strip, of which part of its length is coherent with a stack of paper impregnated with phenol-aldehyde resin, was bent by 90° and subsequently the bent extremity was pulled with a slowly increasing force until the strip was torn off.

When in this method, an electrolytic copper foil having a thickness of 35 microns is used, the strip could be loaded with a force of 4830 grams (4).

A rolled copper foil of about 20 microns thick, which had been attached in this manner, loosened with a load of 3220 grams (4).

The figures placed between brackets indicated the number of tests, of which the specified value is the mean value.

For comparison purposes, the values are given for the adherence of a corresponding adhesive, without the addition of a monocarboxylic acid according to the invention, to non-etched foils (A) and to etched foils (B).

Electrolytic copper: A 2060 gms. (6); B 3740 gms. (7)
Rolled copper: A 730 gms. (3); B 1300 gms. (3)

The term "electrolytic copper" is to be understood in this case to mean copper which in the adhered form is obtained by electrolytic deposition of copper from a solution.

Rolled copper is copper which has undergone a deformation with the use of heat and pressure.

As may be seen from the foregoing, the adherence to rolled copper is poor and hence in the known manufacture of synthetic resin covered with copper foil, copper foils manufactured electrolytically are preferred, although they are more expensive than copper foils manufactured by rolling. However, when using the invention, the last mentioned foils may be used without objection. The quantity of the acid used in the invention may be chosen a little higher, but also lower than specified above. Suitable quantities are from 5% to 60% of the adhesive free of solvent.

Other acids which permit of obtaining a similar result are, for example:

| | Grams |
|---|---|
| Acetic acid | 4380 |
| Lactic acid | 4000 |
| Monochloroacetic acid | 3980 |
| Propionic acid | 4320 |
| Butyric acid | 3860 |

A favourable circumstance is that the acid has no detrimental effect upon the state of the surface of the material in electrical respect. Thus, a surface resistance of $10^8$ ohms was measured on the substratum, after the copper had been removed by treatment with diluted nitric acid and subsequently the layer was immersed in water for 24 hours (the layer not treated with acid had a surface resistance of $10^7$ ohms under similar conditions).

It has also been found that, when a wire is soldered by a soldering treatment of 15 seconds by means of a soldering iron of 220° C. to a thin circular disc of 5 mms. in diameter, the copper disc does not tear off until the wire is pulled with a force of from 12 to 15 kgs.

What is claimed is:

1. A thermo-setting adhesive composition, particularly adapted to attach copper foil to another object, comprising a butadiene-acrylonitrile copolymer, a thermo-hardenable phenol-aldehyde resin and from 5 to 60% by weight of the dry adhesive composition of a compound selected from the group consisting of the saturated aliphatic monocarboxylic, mono-hydroxy saturated aliphatic monocarboxylic and mono-chloro saturated aliphatic monocarboxylic acids having 1 to 4 carbon atoms in their molecules.

2. A thermo-setting adhesive composition, particularly adapted to attach copper foil to another object, comprising a mixture of the following compounds in parts by weight:

| | Parts |
|---|---|
| Butadiene-acrylonitrile rubbery copolymer (75–25) | 80 |
| Cresol-formaldehyde resol | 100 |
| Formic acid | 15 |

References Cited in the file of this patent

UNITED STATES PATENTS

| | | |
|---|---|---|
| 2,602,193 | Korkatti | July 8, 1952 |
| 2,605,248 | Fisk | July 29, 1952 |
| 2,726,222 | Palmquist et al. | Dec. 6, 1955 |
| 2,902,458 | Teppema | Sept. 1, 1959 |
| 2,918,442 | Gerrard | Dec. 22, 1959 |